United States Patent [19]
Mori

[11] Patent Number: 4,967,356
[45] Date of Patent: Oct. 30, 1990

[54] CONTROL SYSTEM FOR AUTOMATIC TRANSMISSION PRODUCING SHOCK-FREE SHIFT

[75] Inventor: Yasushi Mori, Yokohama, Japan

[73] Assignee: Nissan Motor Company Limited, Yokohama, Japan

[21] Appl. No.: 934,867

[22] Filed: Nov. 25, 1986

[30] Foreign Application Priority Data

Nov. 29, 1985 [JP] Japan ................................ 60-267441

[51] Int. Cl.$^5$ ...................... B60K 41/06; B60K 41/11; G06F 15/20
[52] U.S. Cl. .................................. 364/424.1; 74/866; 74/867
[58] Field of Search ................ 364/424.1; 76/866, 867

[56] References Cited

U.S. PATENT DOCUMENTS

| | | | |
|---|---|---|---|
| 4,031,782 | 6/1977 | Miller et al. | 74/866 |
| 4,102,222 | 7/1978 | Miller et al. | 74/866 |
| 4,611,507 | 9/1986 | Burkel et al. | 74/866 |
| 4,653,350 | 3/1987 | Downs et al. | 74/866 |
| 4,667,540 | 5/1987 | Yagi | 74/866 |
| 4,680,988 | 7/1987 | Mori | 74/866 |
| 4,688,450 | 8/1987 | Hayashi et al. | 74/866 |
| 4,691,285 | 9/1987 | Takeda | 364/424.1 |
| 4,713,989 | 12/1987 | Hayakawa et al. | 74/867 X |

*Primary Examiner*—Felix D. Gruber
*Attorney, Agent, or Firm*—Foley & Lardner, Schwartz, Jeffery, Schwaab, Mack, Blumenthal & Evans

[57] ABSTRACT

A control system according to the present invention is to control an automatic transmission which includes a one-way clutch and a friction element, and is shiftable from one speed ratio to another speed ratio by increasing actuating hydraulic pressure applied to the friction element and releasing the one-way clutch. In the control system, the instant when the one-way clutch is released during a shift operation when the transmission shifts from the one speed ratio to the another speed ratio is determined; and actuating hydraulic pressure applied to the friction element is regulated such that the actuating hydraulic pressure applied to the friction element is held at a fixed magnitude after said instant has been determined. The fixed magnitude is not less than the magnitude of actuating hydraulic pressure applied to the friction element when said instant is determined.

14 Claims, 9 Drawing Sheets

CONTROL SYSTEM FOR AUTOMATIC TRANSMISSION PRODUCING SHOCK-FREE SHIFT

REFERENCE TO RELATED APPLICATIONS

Reference is made to the following related copending U.S. Patent Applications:

U.S. patent application Ser. No. 800,394 filed Nov. 21, 1985 by Yasushi MORI and assigned to Nissan Motor Co., Ltd., now U.S. Pat. No. 4,680,988, issued July 21, 1987; and U.S. patent application Ser. No. 897,475 filed Aug. 18, 1986 by Sadao TAKASE et al. and assigned to Nissan Motor Co., Ltd. still pending.

BACKGROUND OF THE INVENTION

The present invention relates to a control system for an automatic transmission for a wheeled vehicle, such as an automotive vehicle, and more particularly to a control system for an automatic transmission which is designed to alleviate shift shock occurring upon a change in operational state of a one-way clutch during a shift operation.

Laid-open Japanese patent application No. 52-106064 (corresponding to U.S. Pat. No. 4,031,782 issued to Miller et al. on June 28, 1977) discloses a control system for an automatic transmission. This known control system comprises a closed loop controller, and a torque sensor positioned to sense the torque at the transmission output shaft to provide a torque indicative signal. The torque indicative signal is supplied to the closed loop controller which is operative to regulate actuating hydraulic pressure with good precision in response to the torque indicative signal. This control system is therefore directed to the precision control of hydraulic pressure applied to a friction element which is to be engaged during shift operation. Laid-open Japanese patent application No. 53-85264 (corresponding to U.S. Pat. No. 4,102,222 issued to Miller et al. on July 25, 1978) discloses an electronic control system which is directed not only to a precision control of hydraulic pressure applied to a friction element which is to be engaged during a shift operation, but also to a precision control of hydraulic pressure applied to another friction element which is to be released during the shift operation. According to this known control system, a torque sensor senses the torque at the transmission output shaft and provides an output shaft torque indicative signal. A first regulator valve regulates the hydraulic pressure applied to the friction element which is to be engaged during a shift operation, and a second control valve regulates the hydraulic fluid pressure applied to the another friction element which is to be released during the shift operation. An error signal is provided to control the operation of each of the first and second regulator valves. A closed loop controller is operatively coupled with the torque sensor and also with both of the first and second control valves and it receives the output torque indicative signal and generates signals as a function of the output torque indicative signal for controlling the first and second control valves.

In each of the known control systems mentioned above, a torque sensor is positioned to sense the torque at the transmission output shaft and provides an output shaft torque indicative signal. The output shaft torque indicative signal is fed to a closed loop controller which computes an error from a target value and generates a control signal for controlling a regulator valve connected to a friction element such that the output shaft torque varies in a predetermined desired pattern, thus alleviating or avoiding substantial shift shocks.

If the feedback control employed by the above mentioned control systems is to be carried out by a control system using a microcomputer, a microcomputer capable of high speed operation is needed. Such a microcomputer is relatively expensive.

If the output signal of the torque sensor is interferred with by error components, such as noise, this causes a drop in control precision of the whole system immediately since this is a realtime control. Thus, in order to prevent such a drop in control precision, relatively expensive torque sensor that provides noise free performance is required.

The present invention aims at solving the above mentioned problems encountered in the known control systems.

An object of the present invention, therefore, is to provide a control system for an automatic transmission which does not require a torque sensor with high precision performance nor a closed loop controller for controlling actuating hydraulic pressure applied to a friction element.

SUMMARY OF THE INVENTION

A control system according to the present invention is to control an automatic transmission which includes a one-way clutch and a friction element, and is shiftable from one speed ratio to another speed ratio by increasing actuating hydraulic pressure applied to the friction element and releasing the one-way clutch. In the control system, the instant when the one-way clutch is released during a shift operation when the transmission shifts from the one speed ratio to the another speed ratio is determined; and actuating hydraulic pressure applied to the friction element is regulated such that the actuating hydraulic pressure applied to the friction element is held at a fixed magnitude after said instant has been determined. The fixed magnitude is not less than the magnitude of actuating hydraulic pressure applied to the friction element when said instant is determined.

More particularly, the control system is provided with fail-safe operation whereby the actuating hydraulic pressure applied to the friction element is held at the fixed magnitude for a predetermined length of time after said instant has been determined.

According to another aspect of the present invention, a control method is to control an automatic transmission which includes a one-way clutch and a friction element, and is shiftable from one speed ratio to another speed ratio by increasing actuating hydraulic pressure applied to the friction element and releasing the one-way clutch. The control method comprises the steps of: determining the instant when the one-way clutch is released during a shift operation when the transmission shifts from the one speed ratio to the another speed ratio; and regulating actuating hydraulic pressure applied to the friction element such that said actuating hydraulic pressure applied to the friction element is held at a fixed magnitude after said instant has been determined, said fixed magnitude is not less than the magnitude of actuating hydraulic pressure applied to the friction element when said instant is determined.

BRIEF DESCRIPTION OF THE DRAWINGS

FIGS. 3(a), 3(b), and 3(c) are timing diagrams;

DETAILED DESCRIPTION OF THE INVENTION

Figure 1:
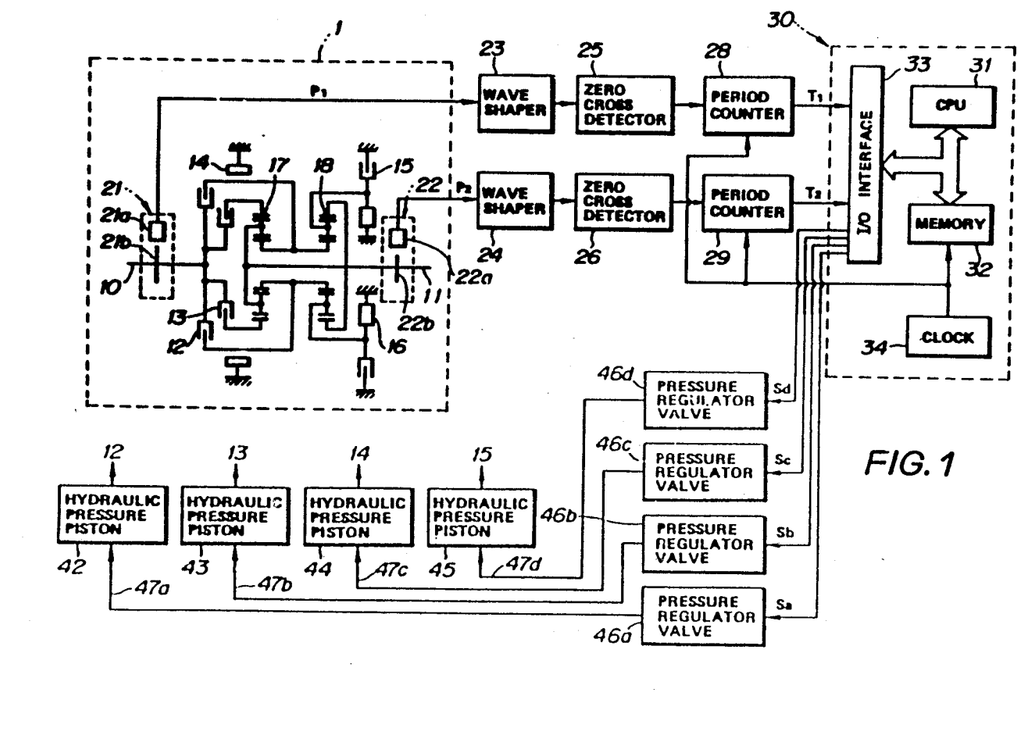
FIG. 1 is a block diagram showing an automatic transmission for a motor vehicle incorporating a first embodiment of a control system according to the present invention.

Referring to FIG. 1, there is schematically shown an automatic transmission 1 installed in a motor vehicle having an engine, not shown. The automatic transmission has an input shaft 10 drivingly connected via a torque converter to the engine in a known manner, an output shaft 11 drivingly connected with driving wheels, not shown, of the motor vehicle in a known manner, and a change-speed gearing which is shiftable to three forward speeds and one reverse speed. The change-speed mechanism comprises two groups of planetary gear sets 17, 18, and a plurality of friction elements that include a front clutch 12, a rear clutch 13, a band brake 14, a low reverse brake 15, and a one-way clutch 16.

Among all, the friction elements 12, 13, 14, and 15 are selectively put into action (engaged/released), thus changing a ratio of the revolution speed of the input shaft 10 to that of the output shaft 11. The friction elements 12, 13, 14, and 15 are engaged or released in each of drive ranges as shown in the following Table.

TABLE

|  | FRONT CLUTCH | REAR CLUTCH | BAND BRAKE | LOW REV. BRAKE |
| --- | --- | --- | --- | --- |
| N,P | X | X | X | X |
| R | O | X | X | O |
| D₁ | X | O | X | X |
| D₂ | X | O | O | X |
| D₃ | O | O | X | X |

In the Table: N: the neutral, P: the parking range, R: the reverse range, $D_1$: the first speed in the drive range, $D_2$: the second speed in the drive range, $D_3$: the third speed in the drive range, O: the engaged state, X: the released state.

The friction elements 12, 13, 14, and 15 are actuated by hydraulic pressure pistons 42, 43, 44, and 45, respectively, such that each of the friction elements is engaged in response to hydraulic fluid pressure supplied to the corresponding hydraulic pressure piston.

The hydraulic pressures supplied to the above mentioned hydraulic pressure pistons 42, 43, 44, and 45 are regulated by pressure regulator valves 46a, 46b, 46c, and 46d, respectively. These pressure regulator valves 46a, 46b, 46c, and 46d are of the identical construction which will be hereinafter described referring to FIG. 2.

Figure 2:
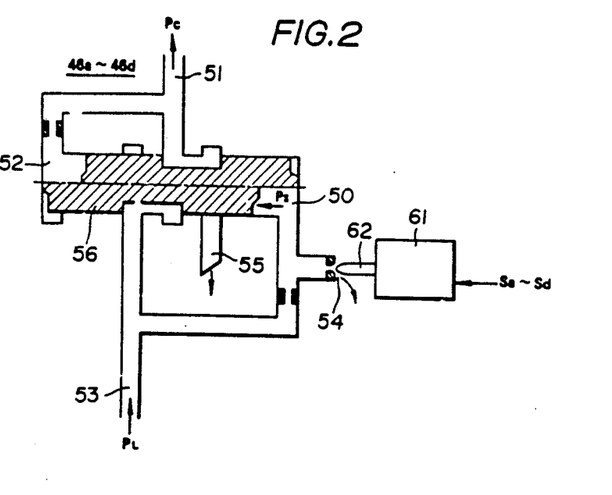
FIG. 2 is a diagrammatic sectional view showing a pressure regulator.

Referring to FIG. 2, the pressure regulator valve has an inlet passage 53 supplied with a predetermined actuating hydraulic pressure $P_L$ from a hydraulic fluid pump, and an outlet passage 51 where an output hydraulic fluid pressure $P_C$ produced after pressure regulation appears. The output fluid pressure $P_C$ is supplied to the corresponding one of the hydraulic pressure pistons. The hydraulic fluid pressure $P_C$ is variable in response to a bias pressure $P_S$ that is variable in response to the drainage rate via a drain 54.

The drainage rate via the drain 54 is variable in response to a bias pressure applied to a needle valve 62, which bias pressure is adjustable by varying the duty factor of an excitation current passing through a solenoid valve 61. That is, when the solenoid valve 61 stays in OFF state (duty factor $D_{ON}=0$), the drain 54 is fully opened, allowing the pressure $P_S$ to drop to its lowest level, thus allowing a spool 56 to assume a position illustrated by an upper half thereof in FIG. 2 wherein the outflow port 51 is allowed to communicate with a drain 55. This causes the output pressure $P_C$ to assume its lowest level. Under this condition, the corresponding friction element is released.

If duty factor $D_{ON}$ is increased, the drainage rate is decreased, causing the bias pressure $P_S$ to increase. In this case, the spool 56 assumes a position where the bias pressure $P_S$ in the chamber 50 balances with the pressure in a feedback chamber 52, causing the output pressure $P_C$ to increase.

The solenoid valves for the regulator valves 46a, 46b, 46c and 46d are supplied with excitation currents, respectively, having duty factors Sa, Sb, Sc, and Sd which are determined by a controller 30. The controller 30 is a microcomputer system that comprises a CPU 31, a memory 32, an I/O interface 33 and a system clock 34.

In order to detect or measure a ratio r of the revolution speed of the input shaft 10 to that of the output shaft 11, a detector is provided which includes the control unit 30. It also includes an input shaft revolution speed sensor 21, an output shaft revolution speed sensor 22, wave shapers 23, 24, zero cross detectors 25, 26, and period counters 28, 29. The sensor 21 includes a magnetic pinion 21b attached to the input shaft 10 and a magnetic pick-up 21a arranged adjacent to the magnetic pinion 21. According to this arrangement, the magnetic pick-up 21a generates a pulse train signal $P_1$ having a frequency variable in proportion to the revolution speed of the magnetic pinion 21, i.e., the revolution speed of the input shaft 10.

Similarly, the sensor 22 includes a magnetic pinion 22b attached to the output shaft 11, and a magnetic pick-up 22a. The magnetic pick-up 22a generates a pulse train signal $P_2$ having a frequency variable in proportion to the revolution speed of the output shaft 11.

Figure 3A:
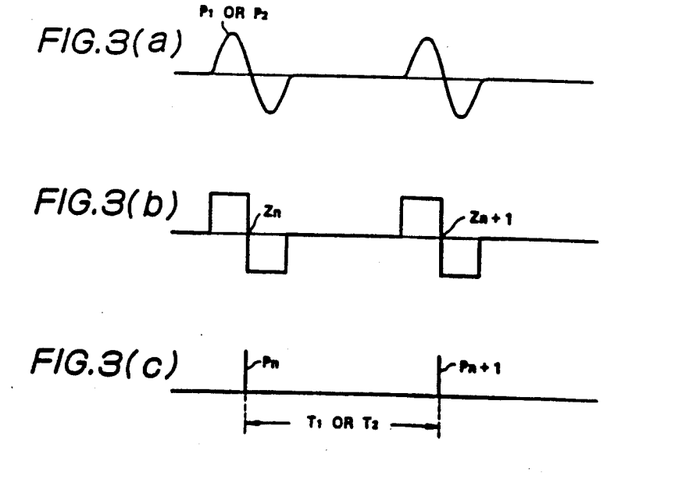

As shown in FIG. 3(a), one pulse of each of the above mentioned pulse train signals $P_1$ and $P_2$ is generated whenever each of the teeth of the corresponding one of the magnetic wheels 21b and 22b passes the corresponding one of the magnetic pick-ups 21a and 22b. The pulse train signals $P_1$ and $P_2$ are converted by the wave shapers 23 and 24, respectively, into square-shaped pulses, as shown in FIG. 3(b). At the zero cross detectors 25 and 26, a zero cross point $Z_n$ (n=the integer) of each of said square-shaped pulses is detected, and a trigger pulse $P_n$ (n=the integer) as shown in FIG. 3(c) is generated. Each of the period counters 28 and 29 is provided with a counter that counts the output of a clock 34 mounted within the controller 30. Whenever it receives a trigger pulse $P_n$, the content of the counter generated as its output is applied to an output register to be stored therein and the counter is reset. Thus, the content of the output register corresponds to the length of time, i.e., a time interval, between the subsequently occurring adjacent two trigger pulses $P_n$ and $P_{n+1}$ and this length of time $T_1$ or $T_2$ corresponds to the period of the corresponding pulse train signal $P_1$ or $P_2$. Hereinafter, the reference character $T_1$ is used to denote the period of the pulse train signal $P_1$, and the reference character $T_2$ is used to denote the period of the pulse train signal $P_2$.

Figure 4:
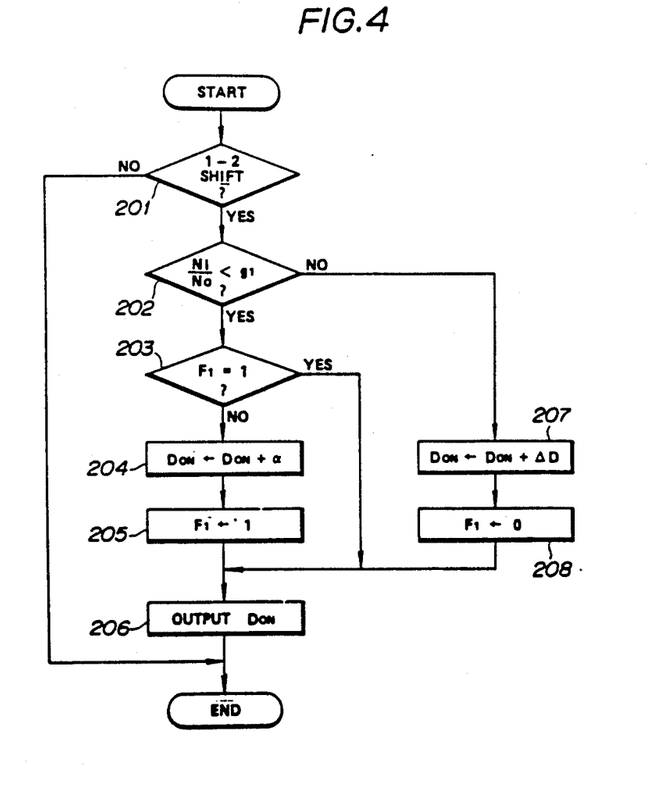
FIG. 4 is a flow chart of a routine executed by the controller shown in FIG. 1.

FIG. 4 is a flow chart showing a routine of a control program executed by the above mentioned controller 30. This routine is directed to controlling the magnitude of actuating hydraulic pressure applied to the band brake 14. The execution of this routine is repeated upon expiration of a predetermined length of time $\Delta T$ (delta T).

Referring to FIG. 4, step 201 involves determining whether there is a demand for 1-2 upshift. What is done to make the determination in step 201 comprises selecting one running range out of [N, P], [R], [$D_1$], [$D_2$], [$D_3$] based on parameters detected, such as, the vehicle speed, the position of a shift lever, and the opening degree of an engine throttle valve. It also comprises comparing a new running range determined in the current run of the routine with an old running range determined in the previous run thereof, and deciding whether [$D_1$] range determined in the previous run has changed to [$D_2$] range determined in the current run, i.e., whether 1-2 upshift is demanded.

As will be readily understood from the Table, it is when 1-2 upshift takes place that the band brake 14 shifts from the released state thereof to the engaged state thereof. This explains the reason why it is decided in step 201 whether 1-2 upshift is demanded.

If it has been decided in step 201 that there is the demand for 1-2 upshift, step 202 is executed to determine whether a ratio Ni/No, i.e., a ratio of revolution speed of the input shaft 10 to that of the output shaft 11, is less than a predetermined value $g_1$. The ratio Ni/No is given by calculating a ratio $T_2/T_1$, where $T_1$ is the period of the pulse train signal $P_1$ stored in the output register of the period counter 28, and $T_2$ is the period of the pulse train $P_2$ stored in the output register of the period counter 29. These periods $T_1$ and $T_2$ are read and stored before calculating $T_2/T_1$.

The above mentioned predetermined value $g_1$ is equal to a gear ratio to be established during running with the first speed ratio. Thus, the process in step 202 is equivalent to the process of determining or detecting the instant when the before mentioned one-way clutch 16 is released.

Figure 5A:
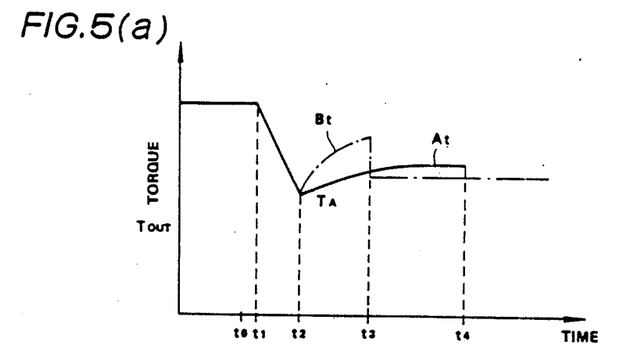
FIGS. 5(a), 5(b), and 5(c) are timing diagrams during a 1-2 upshift operation.
Figure 5B:
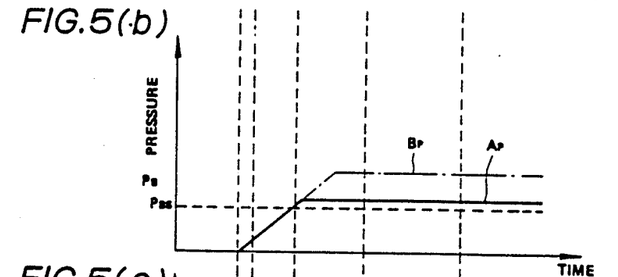
Figure 5C:
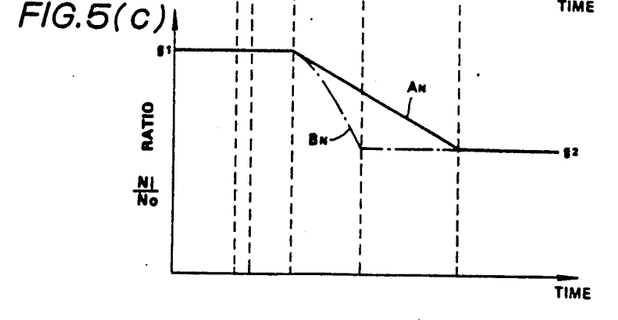

FIGS. 5(a), 5(b), and 5(c) are graphs showing variation with respect to time of output shaft torque $T_{OUT}$ taking place during 1-2 upshift operation, variation with respect to time of actuating hydraulic pressure $P_B$ applied to the band brake 14 during the 1-2 upshift operation, and variation with respect to time of the ratio Ni/No during 1-2 upshift operation.

Referring also to FIGS. 5(a), 5(b), and 5(c), if the demand for 1-2 upshift has occurred, an answer to the inquiry in step 201 becomes YES, but since at this instant $t_0$ the ratio Ni/No remains equal to the gear ratio $g_1$ for the first speed, an answer to the inquiry in step 202 is NO.

Thus, under this condition, the duty factor $D_{ON}$ of excitation current Sc passing through the solenoid of the pressure regulator valve 46c that is provided to regulate the magnitude of actuating hydraulic pressure $P_B$ applied to the band brake 14 is increased by a predetermined amount $\Delta D$ (delta D) in the subsequent step 207. Then, in step 208, a flag $F_1$ is reset. This flag $F_1$ is adapted to be set in step 205 which will be later explained.

In step 206, the excitation current Sc with the duty factor $D_{ON}$ having been increased by $\Delta D$ in step 207 is allowed to pass through the solenoid of the pressure regulator valve 46c.

As a result, the supply of actuating hydraulic pressure $P_B$ to the band brake 14 is initiated and 1-2 upshift operation begins.

As long as the relationship Ni/No=$g_1$ holds, since the answer to the inquiry in step 202 is NO, the duty factor $D_{ON}$ is increased by $\Delta D$ (delta D) after expiration of each routine cycle $\Delta T$ (delta T) owing to the process in step 207. As a result, as shown in FIG. 5(b), actuating hydraulic pressure $P_B$ increases.

As actuating hydraulic pressure $P_B$ increases, a play existing in the band brake 14 decreases. When the play becomes zero, the band brake 14 starts engaging, establishing slipping state between the drum and brake band (at the instant $t_1$ shown in FIGS. 5(a), 5(b) and 5(c)). When the band brake 14 starts engaging, the output shaft torque $T_{OUT}$ starts decreasing.

When actuating hydraulic pressure $P_B$ further increases and reaches a certain value $P_{BS}$, the operational state of the one-way clutch 16 shifts from the engaged state to the released state (at the instant $t_2$) or released.

After the one-way clutch 16 has been released, the output shaft torque $T_{OUT}$ begins to increase. This is the phenomena which is caused by releasing of inertia component derivable from the engine side as a result of a shift from the first speed to the second speed.

If, after this instant $t_2$, actuating hydraulic pressure $P_B$ applied to the band brake 14 continues to increase at the same rate as before the instance $t_2$ in a manner as shown by a curve $B_P$ drawn by the one-dot chain line (see FIG. 5(b)), since the inertia component of torque on the engine side is, allowed to be delivered to the output shaft, the output shaft torque $T_{OUT}$ increases rapidly in a manner as shown by a curve $B_t$ drawn by the one-dot chain line (see FIG. 5(a)), causing occurrence of substantial shift shock. Under this condition, the ratio Ni/No varies rapidly in a manner as shown by a curve $B_N$ drawn by the one-dot chain line (see FIG. 5(c)).

As compared to this, according to this embodiment, this instant $t_2$ where the one-way clutch 16 is released is detected or determined upon recognizing the initiation of decrease in the ratio Ni/No (step 202), and thereafter actuating hydraulic pressure $P_B$ is maintained at a level slightly higher than the pressure level $P_{BS}$ occurring at the instance $t_2$, this level being shown by the fully drawn horizontal line $A_P$ in FIG. 5(b). As a result, the inertia component derivable from the engine side is released via a slip taking place within the band brake 14 so that rapid variation in the output shaft torque $T_{OUT}$ is prevented. During the transistion under this condition, the output shaft torque $T_{OUT}$ increases less rapidly as shown by the fully drawn curve $A_t$ in FIG. 5(a), and the ratio Ni/No varies less rapidly as shown by the fully drawn line $A_N$ in FIG. 5(c).

Referring back to FIG. 4, the above mentioned mode of holding the magnitude of actuating hydraulic pressure at the level $A_P$ is hereinafter explained. In step 204, duty factor $D_{ON}$ is increased by the predetermined value $\alpha$ (alpha), and then in step 205, the flag F is set. Since, once the flag F has been set, the steps 204 and 205 are bypassed in the subsequent runs of the routine, the duty factor $D_{ON}$ which has been increased once by the predetermined value $\alpha$ (alpha) in step 204 continues to be output after completion of each of the subsequent runs. In other words, the duty factor $D_{ON}$ is fixed.

After this pressure state has been maintained for a while, the ratio Ni/No drops down to reach the gear ratio $g_2$ for the second speed (at the instant $t_4$), completing the 1-2 upshift operation at this instant $t_4$.

Although, in this embodiment, actuating hydraulic pressure $P_B$ is held at the level $A_P$ that is slightly higher than the actuating hydraulic pressure value $P_{BS}$, substantially the same operation and effect can be provided if the actuating hydraulic pressure is maintained at the value $P_{BS}$.

Figure 6:
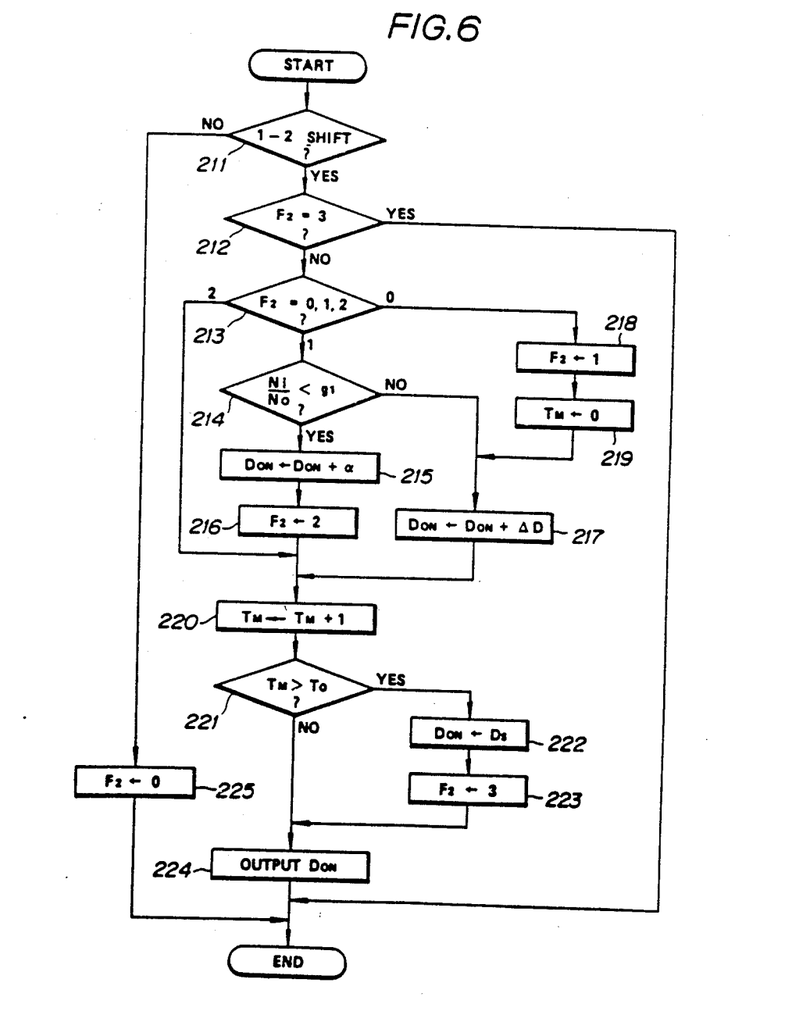
FIG. 6 is a flow chart of another routine which may be executed by the controller shown in FIG. 1.

Referring to FIG. 6, a second embodiment is described hereinafter.

FIG. 6 is a flow chart of a routine executed by a control unit 30, which processes are slightly different from that of the first embodiment. The execution of the routine shown in FIG. 6 is repeated upon expiration of a predetermined length of time.

The routine shown in FIG. 6 features the addition of a fail-safe whereby a shift operation is terminated upon expiration of a predetermined length of time computed from the initiation of the shift operation even if the indication shows that the shift operation is undergoing. With this fail-safe, unnecessary long slip mode operation of the friction element, i.e., the band brake 14 in this embodiment, is prevented, thus preventing the friction element from wearing at a quick rate.

Referring to FIG. 6, step 211 comprises substantially the same processes executed in step 201 shown in FIG. 4. If an answer to the inquiry in step 211 is YES, i.e., if there is demand for 1-2 upshift, a decision is made in step 212 whether flag $F_2$ is set equal to 3. The meaning of this flag $F_2$ is such that if $F_2$ is equal to 0, this indicates the state before initiation of a shift operation, if $F_2$ is equal to 1, this indicates the state when the shift operation is undergoing, if $F_2$ is equal to 2, this indicates the state where the actuating hydraulic pressure is maintained, and if $F_2$ is equal to 3, this indicates the state when the shift operation has completed.

Since the flag $F_2$ is equal to 0 immediately after it has been determined that there has occurred demand for 1-2 upshift, processes in steps 218 and 219 are executed after executing the processes in steps 212 and 213. In step 219, a predetermined time counter $T_M$ is reset.

Then, in step 217, the duty factor $D_{ON}$ of the excitation current $S_C$ passing through the solenoid of the pressure regulator valve 46c is increased so as to increase actuating hydraulic pressure $P_B$ applied to the band brake 14. The process in this step is the same as that in step 207 shown in FIG. 4.

Subsequently, in step 220, the above mentioned time counter $T_M$ is increased by an increment 1, and in step 221, a decision is made whether the content of $T_M$ is greater than a predetermined value $T_O$.

This predetermined value $T_O$ is chosen such that it represents the length of time which is sufficiently longer than a length of time required for a normal 1-2 upshift operation but not so long as to an extent that it would cause excessive generation of heat that breaks down the friction element and/or excessive wear of the friction element.

In step 224, the duty factor $D_{ON}$ is output, initiating an increase in actuating hydraulic pressure $P_B$ applied to the band brake 14, commencing 1-2 upshift operation.

Since the flag $F_2$ has been set equal to 1 in step 218, the processes in steps 214, 215, and 216 or the processes in steps 214 and 217 are executed from the subsequent run of the routine. Steps 214, 215, and 217 comprise the same processes as those in steps 202, 204, and 207, respectively, shown in FIG. 4. Thus, actuating hydraulic pressure $P_B$ applied to the band brake 14 is increased until the one-way clutch 16 is released, and after the one-way clutch 16 has been released, actuating hydraulic pressure $P_B$ is maintained at a level slightly higher than the pressure level $P_{BS}$ occurring at the instant when the one-way clutch 16 is released.

After actuating hydraulic pressure $P_B$ has been held, the flag $F_2$ is set equal to 2 in step 216. In the subsequent runs of the routine, therefore, the increment of the time counter $T_M$ is repeated in step 220 until the content of the time counter $T_M$ exceeds the predetermined value $T_O$, and thus the pressure hold mode continues until the time counter $T_M$ exceeds the predetermined value $T_O$.

If the content of the time counter $T_M$ exceeds the predetermined value $T_O$, an answer to the inquiry in step 221 becomes YES, and the duty factor $D_{ON}$ is set equal to a predetermined value $D_S$ in step 222. This predetermined value $D_S$ is chosen such that, with the excitation current having the duty factor $D_S$, the pressure regulator valve will provide actuating hydraulic pressure sufficiently high enough to bring the band brake 14 into firmly engaged state.

Thus, the band brake 14 is completely engaged when the duty factor $D_{ON}$ having been set equal to $D_S$ is output, thus terminating the shift operation.

Since, in step 223, the flag $F_2$ is set equal to 3, the shift operation is terminated even if there exists demand for 1-2 upshift as a result of judgement in step 212.

The flag $F_2$ is reset in step 225 when it has been recognized that demand for 1-2 upshift has disappeared.

In the above manner, according to this embodiment, the shift operation is terminated upon expiration of the predetermined length of time $T_O$ beginning with the occurrence of YES as the answer to the inquiry in step 211, thus providing a fail-safe against the excessive heating and/or worn-out the band brake 14.

In the preceding embodiments, the instant when the one-way clutch 16 is released is determined by monitoring the ratio Ni/No, but it may be determined by monitoring the variation in output shaft torque $T_{OUT}$ of the automatic transmission 1.

Figure 7:
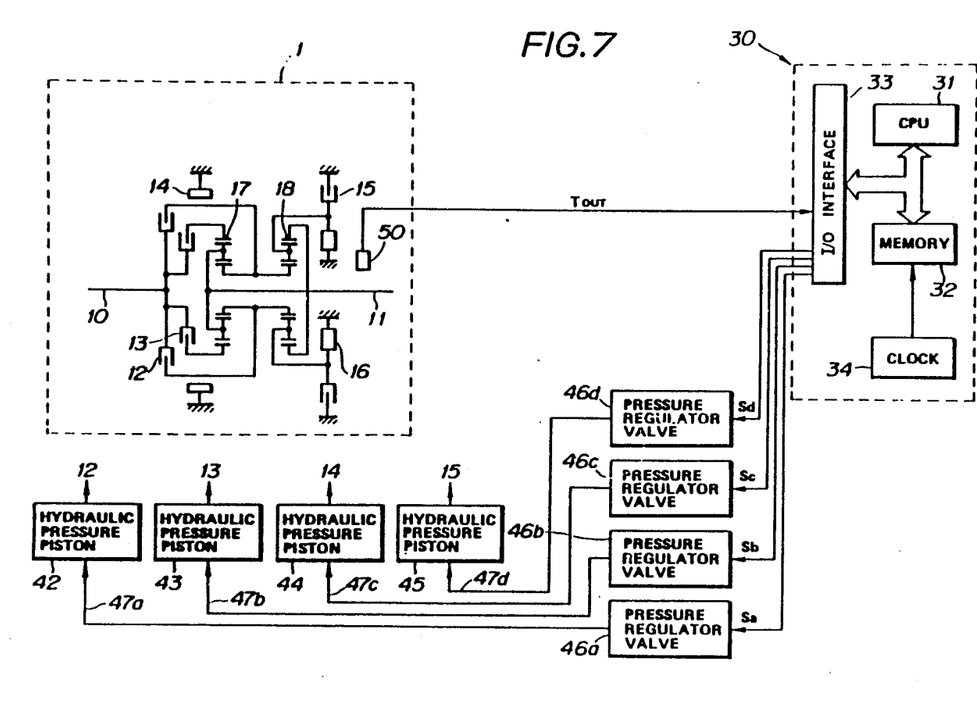
FIG. 7 is a view similar to FIG. 1 showing another embodiment of a control system according to the present invention.

FIG. 7 shows a third embodiment which embodies the above mentioned modification.

This third embodiment is different from the first embodiment shown in FIG. 1 only in the provision of a torque sensor 50 instead of sensors 21 and 22, wave shapers 23 and 24, zero cross detectors 25 and 26, and period counters 28 and 29 shown in FIG. 1. The torque sensor 50 measures torque on a transmission output shaft 11 and generates an output signal indicative of the output shaft torque $T_{OUT}$. This output signal is supplied to a controller 30. The other hardware is the same as that of the first embodiment.

The controller 30 executes the process of determining the instant when the one-way clutch 16 is released and then the process of controlling the level of actuating hydraulic pressure $P_B$ similarly to the first and second embodiments.

Figure 8:
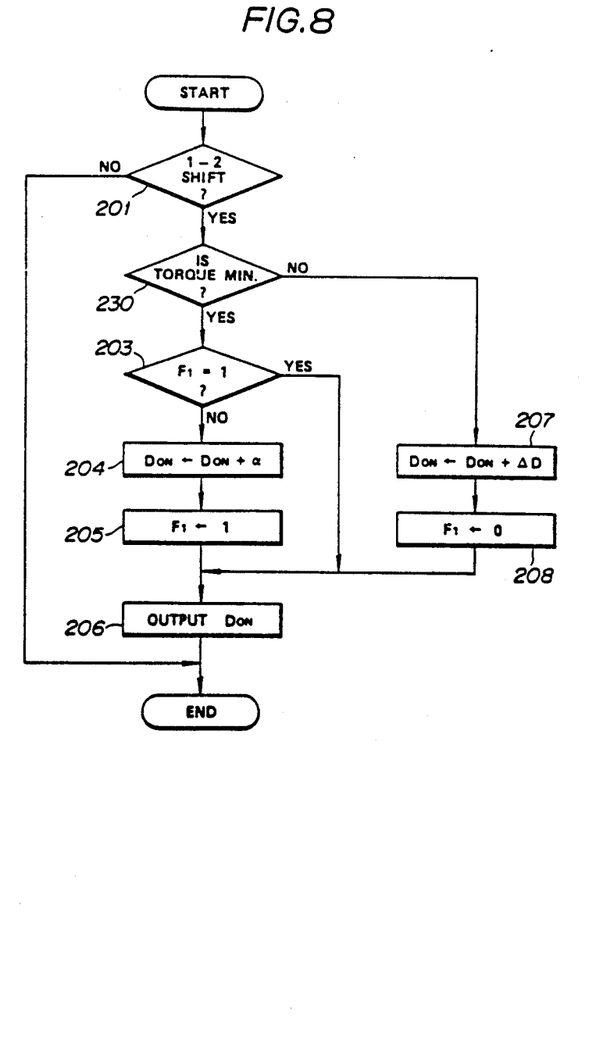
FIG. 8 is a flow chart of a routine executed by the controller shown in FIG. 7.
Figure 9:
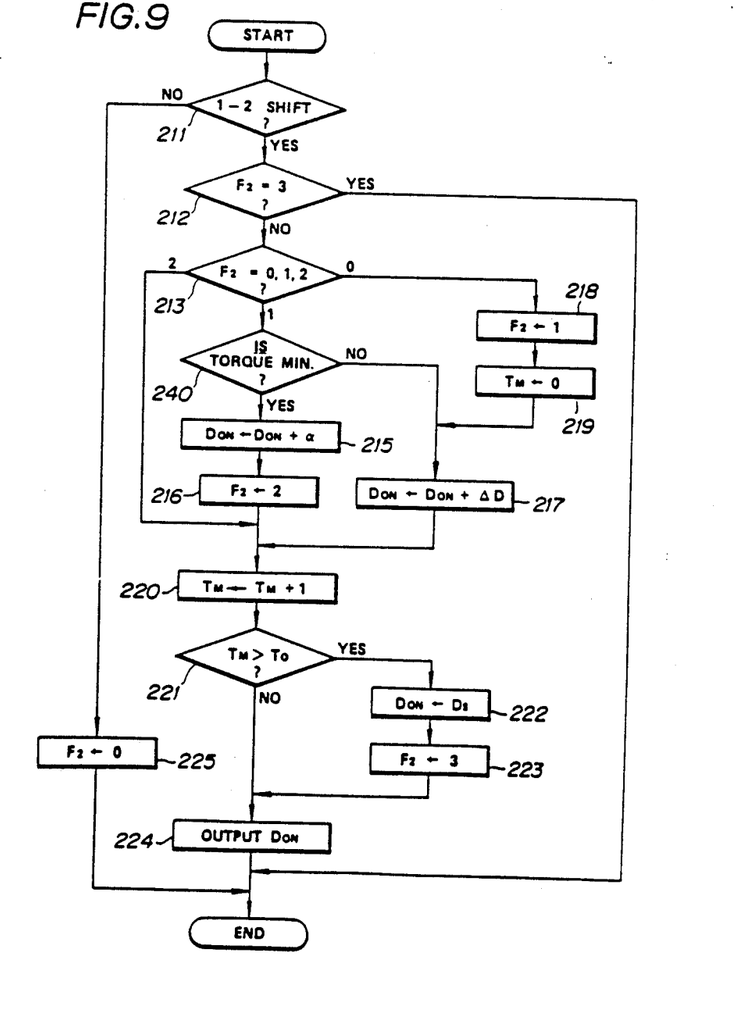
FIG. 9 is a flow chart of another routine which may be executed by the controller shown in FIG. 7.

FIGS. 8 and 9 are flow charts of routines which may be executed by the controller 30 shown in FIG. 7. The flow chart shown in FIG. 8 is substantially the same as the flow chart shown in FIG. 4 except the provision of step 230 instead of step 202 shown in FIG. 4. The flow chart shown in FIG. 9 is substantially the same as the flow chart shown in FIG. 6 except the provision of step 250 instead of step 214 shown in FIG. 6.

In each of steps 230 and 240, what is done is to decide whether the output shaft torque $T_{OUT}$ has dropped down to the minimum after 1-2 upshift operation has been initiated.

As shown in FIG. 5(a), the output shaft torque $T_{OUT}$ becomes the minimum $T_A$ at the instant $t_2$ when the one-way clutch 16 is released. This indicates that the process in each of the above mentioned steps 230 and 240 is effective in determining the instant $t_2$.

Consequently, the instant $t_2$ is determined when the sign of a result of subtraction of the output shaft torque $T_{OUT}(n)$ obtained in the current run of the routine from the output shaft torque $T_{OUT}(n-1)$ obtained in the previous run of the routine has changed from negative to positive.

Figure 10:
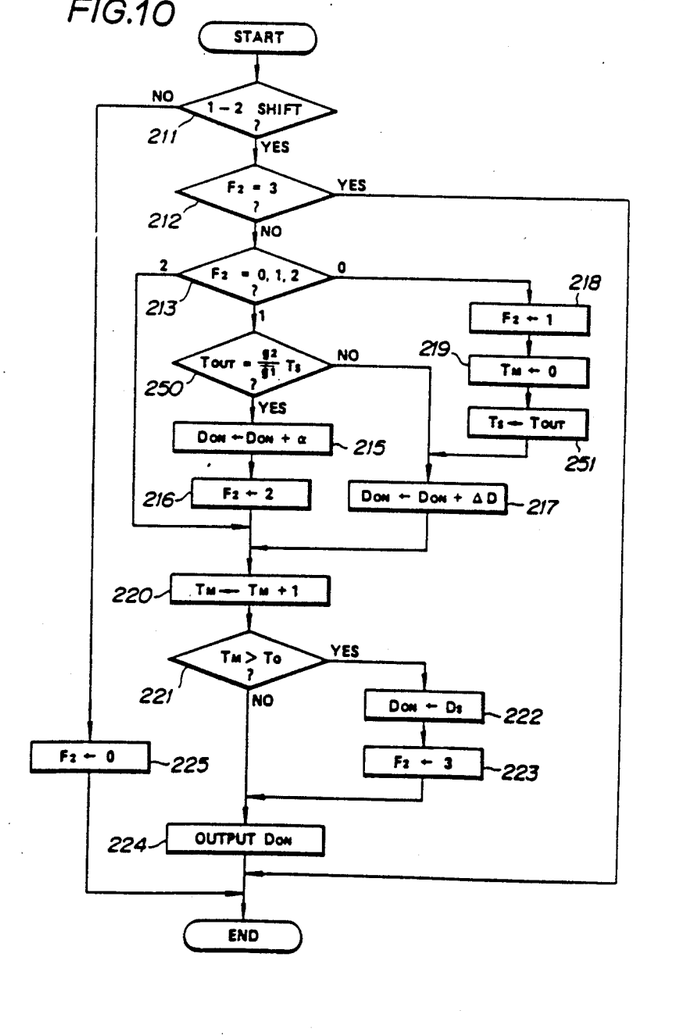
FIG. 10 is a flow chart of still another routine which may be executed by the controller shown in FIG. 7.

FIG. 10 shows another flow chart of a routine which may be executed by the controller 30 shown in FIG. 7. In this routine, the instant when the one-way clutch 16 is released is determined by using the following relationship: That is, if it is assumed that the output shaft torque during running with the first speed is $T_1$ and the output shaft torque during running with the second speed is $T_2$, $T_2$ may be expressed as, $$T_2 = (g_2/g_1) \times T_1$$

where, $g_1$: the gear ratio of the first speed,
$g_2$: the gear ratio of the second speed.

The instant when the one-way clutch 16 is released can be determined using the above relationship.

It is described in more detail referring to FIG. 10. The flow chart illustrated herein is substantially the same as the flow chart shown in FIG. 9 except the provision of step 250 instead of step 240 and the addition of step 251 immediately after step 219. In step 251, the output shaft torque $T_{OUT}$ stored immediately after initiation of 1-2 shift operation is stored as $T_S$. The content of $T_S$ is equivalent to the output shaft torque $T_1$ during running with the first speed. In step 250, a decision is made whether the output shaft torque $T_{OUT}$ which is expressed by $T_{OUT} = (g_2/g_1) \times T_S$ has been generated.

The flow chart shown in FIG. 8 may be modified such that the above mentioned relationship is used in determining the instant when the one-way clutch 16 is released. In detail, step similar to step 250 is provided instead of step 230 of FIG. 8 and step similar to step 251 is added immediately after step 208 of FIG. 8.

Since the control executed by the system shown in FIG. 7 uses the output of the torque sensor only for determining the instant when the one-way clutch 16 is released and does not use the output of the torque sensor as a feedback signal, the torque sensor which may be used in this system does not need a high degree of precision performance.

I claim:

1. A control system for an automatic transmission including a one-way clutch and a friction element, the automatic transmission being shiftable from one speed ratio to another speed ratio by increasing actuating hydraulic pressure applied to the friction element and causing the one-way clutch to overwheel, thus being released, the control system comprising:
   means for determining the instant when the one-way clutch is overwheeled and thus released during a shift operation when the transmission shifts from the one speed ratio to the another speed ratio; and
   means for regulating actuating hydraulic pressure applied to the friction element such that aid actuating hydraulic pressure applied to the friction element is held at a fixed magnitude after said determining means has determined said instant, said fixed magnitude being not less than the magnitude of the actuating hydraulic pressure applied to the friction element when said determining means determines said instant.

2. A control system as claimed in claim 1, wherein said determining means includes:
   an input shaft revolution speed sensor positioned to sense the revolution speed at the transmission input shaft to provide a first pulse train signal having a frequency variable in proportion to the revolution speed sensed;
   an output shaft revolution speed sensor positioned to sense the revolution speed at the transmission output shaft to provide a second pulse train having a frequency variable in proportion to the revolution speed sensed;
   means for detecting a period of said first pulse train signal and providing a first period indicative signal indictive of said period detected;
   means for detecting a period of said second pulse train signal and providing a second period indicative signal indicative of said period detected; and
   a controller to calculate a ratio of said first period indicative signal to said second period indicative signal, compare said ratio with a predetermined value to decide whether said ratio attains a predetermined relationship with said predetermined value, and determine the instant immediately after said ratio has attained said predetermined relationship.

3. A control system as claimed in claim 2, wherein said actuating hydraulic pressure regulating means includes: a pressure regulator valve hydraulically connected to the friction element, said pressure regulator valve having a spool means movable responsive to a bias pressure for regulating said actuating hydraulic pressure applied to the friction element, and a solenoid valve positioned to regulate said bias pressure, said solenoid valve being operative by electric current passing therethrough, said electric current having a duty factor that is controllable; and wherein said controller varies said duty factor such that said duty factor is held at a fixed value after said ratio has attained said predetermined relationship.

4. A control system as claimed in claim 1, wherein said determining means includes:
   a torque sensor positioned to sense the output torque at the transmission output shaft to provide an output shaft torque indicative signal; and a controller to determine whether said output torque indicative signal has reached the minimum, and determine the instant immediately after said torque indicative signal has reached the minimum.

5. A control system as claimed in claim 4, wherein said actuating hydraulic pressure regulating means includes: a pressure regulator valve hydraulically connected to the friction element, said pressure regulator valve having a spool means movable responsive to a bias pressure for regulating said actuating hydraulic pressure applied to the friction element, and a solenoid valve positioned to regulate said bias pressure, said solenoid valve being operative by electric current passing therethrough, said electric current having a duty factor that is controllable; and wherein said controller varies said duty factor such that said duty factor is held at a fixed value after said output shaft torque indicative signal has reached the minimum.

6. A control system for an automatic transmission including a one-way clutch and a friction element, the automatic transmission being shiftable from one speed ratio to another speed ratio by increasing actuating hydraulic pressure applied to the friction element causing the one-way clutch to overwheel and be released, the control system comprising:
  means for determining the instant when the one-way clutch overwheels and is released during a shift operation when the transmission shifts from the one speed ration to another ratio; and
  means for regulating actuating hydraulic pressure applied to the friction element such that said actuating hydraulic pressure applied to the friction element is held at a fixed magnitude for a predetermined length of time after said determining means has determined said instant and then allowed to increase upon elapse of said predetermined length of time, wherein said fixed magnitude is not less than the magnitude of actuating hydraulic pressure applied to the friction element when said determining means determines said instant.

7. A control system as claimed in claim 6, wherein said determining means includes:
  an input shaft revolution speed sensor positioned to sense the revolution speed at the transmission input shaft to provide a first pulse train signal having a frequency variable in proportion to the revolution speed sensed;
  an output shaft revolution speed sensor positioned to sense the revolution speed at the transmission output shaft to provide a second pulse train having a frequency variable in proportion to the revolution speed sensed;
  means for detecting a period of said first pulse train signal and providing a first period indicative signal indicative of said period detected;
  means for detecting a period of said second pulse train signal and providing a second period indicative signal indicative of said period detected; and
  a controller to calculate a ratio of said first period indicative signal to said second period indicative signal, compare said ratio with a predetermined value to decide whether said ratio attains a predetermined relationship with said predetermined value, and determine the instant immediately after said ratio has attained said predetermined relationship.

8. A control system as claimed in claim 7, wherein said actuating hydraulic pressure regulating means includes: a pressure regulator valve hydraulically connected to the friction element, said pressure regulator valve having a spool means movable responsive to a bias pressure for regulating said actuating hydraulic pressure applied to the friction element, and a solenoid valve positioned to regulate said bias pressure, said solenoid valve being operative by electric current passing therethrough, said electric current having a duty factor that is controllable; and wherein said controller varies said duty factor such that said duty factor is held at a fixed value for said predetermined length of time after said ratio has attained said predetermined relationship.

9. A control system as claimed in claim 6, wherein said determining means includes:
  a torque sensor positioned to sense the output torque at the transmission output shaft to provide an output shaft torque indicative signal; and
  a controller to determine whether said output torque indicative signal has reached the minimum, and determine the instant immediately after said torque indicative signal has reached the minimum.

10. A control system as claimed in claim 9, wherein said actuating hydraulic pressure regulating means includes: a pressure regulator valve hydraulically connected to the friction element, said pressure regulator valve having a spool means movable responsive to a bias pressure for regulating said actuating hydraulic pressure applied to the friction element, and a solenoid valve positioned to regulate said bias pressure, said solenoid valve being operative by electric current passing therethrough, said electric current having a duty factor that is controllable; and wherein said controller varies said duty factor such that said duty factor is held at a fixed value for said predetermined length of time after said output shaft torque indicative signal has reached the minimum.

11. A control system as claimed in claim 6, wherein said determining means includes:
  a torque sensor positioned to sense the output torque at the transmission output shaft to provide an output shaft torque indicative signal; and
  a controller to determine whether said output shaft torque indicative signal has reached a predetermined relationship with the output shaft torque indicative signal stored upon initiation of the shift operation, determine the instant immediately after said output shaft torque indicative signal has reached said predetermined relationship.

12. A control system as claimed in claim 11, wherein said actuating hydraulic pressure regulating means includes: a pressure regulator valve hydraulically connected to the friction element, said pressure regulator valve having a spool means movable responsive to a bias pressure for regulating said actuating hydraulic pressure applied to the friction element, and a solenoid valve positioned to regulate said bias pressure, said solenoid valve being operative by electric current passing therethrough, said electric current having a duty factor that is controllable; and wherein said controller varies said duty factor such that said duty factor is held at a fixed value for said predetermined length of time after said output shaft torque indicative signal has attained said predetermined relationship.

13. A control method for an automatic transmission including a one-way clutch and a friction element, the automatic transmission being shiftable from one speed ratio to another speed ratio by increasing actuating hydraulic pressure applied to the friction element and releasing the one-way clutch, the control method comprising the steps of:
- determining the instant when the one-way clutch is released during a shift operation when the transmission shifts from the one speed ratio to the another speed ratio; and
- regulating actuating hydraulic pressure applied to the friction element such that said actuating hydraulic pressure applied to the friction element is held at a fixed magnitude after said instant has been determined, said fixed magnitude is not less than the magnitude of actuating hydraulic pressure applied to the friction element when said instant is determined.

14. A control method for an automatic transmission including a one-way clutch and a friction element, the automatic transmission being shiftable from one speed ratio to another speed ratio by increasing actuating hydraulic pressure applied to the friction element and releasing the one-way clutch, the control method comprising the steps of:
- determining the instant when the one-way clutch is released during a shift operation when the transmission shifts from the one speed ratio to the another speed ratio; and
- regulating actuating hydraulic pressure applied to the friction element such that said actuating hydraulic pressure applied to the friction element is held at a fixed magnitude for a predetermined length of time after said instant has been determined, said fixed magnitude is not less than the magnitude of actuating hydraulic pressure applied to the friction element when said instant is determined.

* * * * *